(12) United States Patent
Cho

(10) Patent No.: US 6,226,053 B1
(45) Date of Patent: May 1, 2001

(54) VIDEO LINE CONNECTION APPARATUS FOR ADAPTIVELY CONNECTING EXTERNAL INPUT/OUTPUT LINE

(75) Inventor: Kee-yeong Cho, Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 08/943,295

(22) Filed: Oct. 14, 1997

(30) Foreign Application Priority Data

Oct. 11, 1996 (KR) .................................................. 96/45339

(51) Int. Cl.⁷ .................................................. H04N 5/268
(52) U.S. Cl. ........................ 348/705; 348/706; 348/708; 348/554
(58) Field of Search .................................... 348/706, 705, 348/554, 555, 558

(56) References Cited

U.S. PATENT DOCUMENTS

| 5,018,013 | * | 5/1991 | Rabii | 348/380 |
| 5,325,202 | * | 6/1994 | Washino | 348/705 |
| 5,438,375 | * | 8/1995 | Sasabe et al. | 348/706 |
| 5,500,690 | * | 3/1996 | Vilard | 348/706 |
| 5,838,393 | * | 12/1999 | Simpson et al. | 348/705 |
| 5,886,545 | * | 3/1999 | Sakuda et al. | 348/705 |
| 5,898,463 | * | 4/1999 | Nishiyama | 348/554 |
| 5,999,227 | * | 12/1999 | Doherty et al. | 348/554 |

* cited by examiner

Primary Examiner—Reinhard Eisenzopf
Assistant Examiner—Trang U. Tran
(74) Attorney, Agent, or Firm—Dilworth & Barrese, LLP

(57) ABSTRACT

A video line connection apparatus for adaptively connecting external input/output lines, the apparatus capable of flexibly selecting an output by responding to the external line which is connected to an input jack. The apparatus includes: a plurality of composite video input jacks; a plurality of Y/C separated video input jacks; at least one composite video output jack; at least one Y/C separated video output jack; a first multiplexer; a second multiplexer; a third multiplexer; a luminance/chrominance signal separating unit; an on-screen path control unit; a chrominance signal path control unit; and a control unit. The apparatus offers convenience to the user and dispels the user's uneasiness caused by improper connection of video lines.

5 Claims, 2 Drawing Sheets

VIDEO LINE CONNECTION APPARATUS FOR ADAPTIVELY CONNECTING EXTERNAL INPUT/OUTPUT LINE

BACKGROUND OF THE INVENTION

1. Field of the Invention

The present invention relates to a video/audio line connection apparatus and more particularly, to a video line connection apparatus for adaptively connecting external input/output lines, the apparatus capable of forming a path for a signal by checking the connection state of the input/output terminal of the apparatus to which the external input/output lines are connected.

2. Description of the Prior Art

In order to display a video signal on the screen of a television set, it is necessary to connect a video line from the video source device to the television set. However, as shown in FIG. 1, it may be very difficult to connect the video line with the television set 70, given the many types of video source devices such as the video cassette recorder (VCR) 10, the laser disk player (LDP) 20, the digital video disk player (DVD) 30, and the satellite broadcasting receiver (BS) 40. Furthermore, different video source devices have different output video signal configurations, such as Y/C separated or super video signals and composite (Y/C joined) video signals. Y refers to luminance and C refers to chrominance. Accordingly, as shown in FIG. 1, the line connections of the composite video line jacks 14, 18, 24, 34, 44, 53, 55, 57, 59, 61, and 74 and the Y/C separated or super video line jacks 12, 16, 22, 32, 42, 52, 54, 56, 58, 60 and 72 are complicated.

To solve the problem in connecting the video lines, the video source devices 10 to 40 are connected to a television set 70 through an audio/video line connection device, i.e., A/V controlling device 50.

As shown in FIG. 1, in the case that the Y/C separated video output jack 32 of a DVD 30 is connected to the Y/C separated video input jack 58 of the A/V controlling device 50; the composite video output jack 24 of an LDP 20 is connected to the composite video input jack 57 of the A/V controlling device 50; and the composite video out put jack 61 of the A/V controlling device 50 is connected to the composite video input jack 74 of the television set 70, it is impossible to view the information outputted from the DVD 30 to the television screen on the television screen. This is because the conventional A/V controlling device 50 generally employs an on-screen integrated circuit chip, and the Y/C separated video signals and the composite video signals cannot be processed simultaneously by the on-screen integrated circuit chip.

Typically, these restrictive details are distributed to users in the user's manual. However, if the users do not read such manuals, they are unaware of these details, and are thereby unable to watch the desired image in the proper connection state.

SUMMARY OF THE INVENTION

Therefore, it is an object of the present invention to provide a video line connection apparatus for adaptively connecting external input/output lines, the apparatus capable of selecting an output by responding to the external line which is connected to an input jack.

To achieve the above-mentioned object, the apparatus according to one embodiment of the present invention includes: a plurality of composite video input jacks, which each generate a first connection signal in response to their connection to an external composite video line, and which each input a composite video signal; a plurality of Y/C separated video input jacks, which each generate a second connection signal in response to their connection to an external Y/C separated video line, and which each input a Y/C separated video signal; at least one composite video output jack, which generates a third connection signal in response to the connection of an external composite video line, and which outputs the composite video signal; at least one Y/C separated video output jack, which generates a fourth connection signal in response to the connection of an external Y/C separated video line, and which outputs the Y/C separated video signal; a control unit, which inputs the first to fourth connection signals generated from the composite video input jacks, the Y/C separated video input jacks, the composite video output jacks and the Y/C separated video output jacks, and which generates a first and a second switching control signals; a first multiplexer, which selects one of the composite video input jacks; a second multiplexer, which selects one of the luminance signal input terminals of the Y/C separated video input jacks; a third multiplexer, which selects one of the chrominance signal input terminals of the Y/C separated video input jacks; a luminance/chrominance signal separating unit, which inputs the composite video signal selected by the first multiplexer and separates that inputted signal into a luminance signal and a chrominance signal; an on-screen path control unit, which selects one of either the composite video signal selected by the first multiplexer, or the luminance signal separated by the luminance/chrominance signal separating unit, or the luminance signal of the Y/C separated video signal selected by the second multiplexer in response to the first switching control signal, mixes the selected signal with an on-screen signal, and outputs the mixed signal to the composite video output jack or to the luminance signal output terminal of the Y/C separated video output jack; and a chrominance signal path control unit, which selects either the chrominance signal separated by the luminance/chrominance signal separating unit or the chrominance signal of the Y/C separated video signal selected by the third multiplexer in response to the second switching control signal, and which outputs the selected signal to the chrominance signal output terminal of the Y/C separated video output jack.

BRIEF DESCRIPTION OF THE DRAWINGS

The above object and advantages of the present invention will be more clearly understood from the following detailed description taken in conjunction with the accompanying drawings, in which.

DETAILED DESCRIPTION OF PREFERRED EMBODIMENTS

The objects, characteristics and advantages of the above-described invention will be more clearly understood through preferred embodiments referring to the attached drawings.

Figure 1:
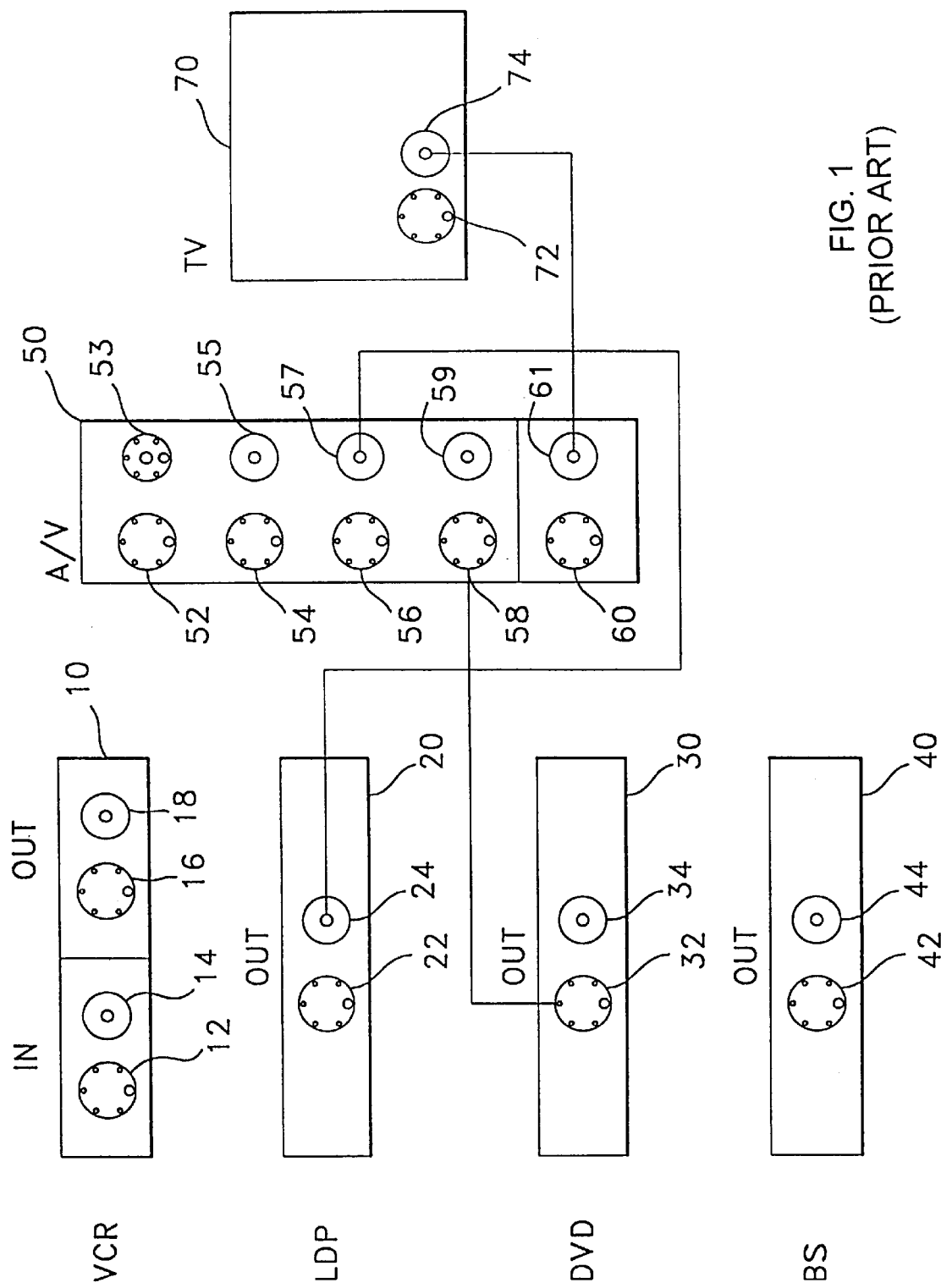
FIG. 1 illustrates a conventional audio/video line connection apparatus.
Figure 2:
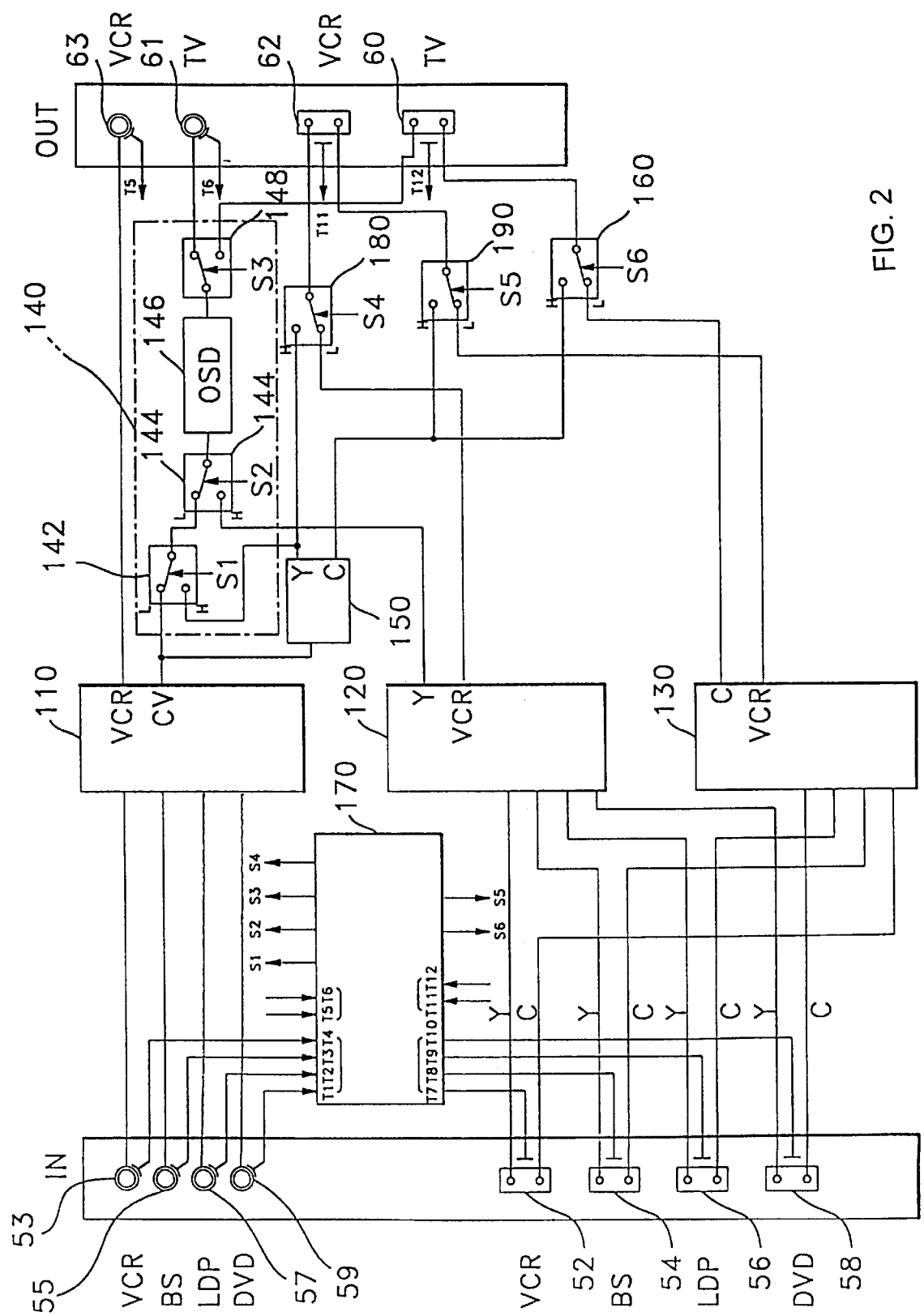
FIG. 2 is a block diagram illustrating a circuit construction of a video line connection apparatus for adaptively connecting external input/output lines according to one embodiment the present invention.

FIG. 2 illustrates a circuit construction of a video line connection apparatus for adaptively connecting external input/output lines according to one embodiment of the present invention. The circuit of FIG. 2 illustrates the connection of video lines excluding the circuit showing the connection of audio line.

The video line connection apparatus illustrated in FIG. 2 includes: a plurality of composite video input jacks 53, 55, 57 and 59, which generate first connection signals T1 to T4 in response to their connection to an external composite video line, and which each input a composite video signal; a plurality of Y/C separated video input jacks 52, 54, 56 and 58, which generate second connection signals T7 to T10 in response to their connection to an external Y/C separated video line, and which each input a Y/C separated video signal; at least one of composite video output jacks 61 and 63, which generate third connection signals T5 and T6 in response to their connection to an external composite video line, and which each output a composite video signal; at least one of Y/C separated video output jacks 60 and 62, which generate fourth connection signals T11 and T12 in response to their connection to an external Y/C separated video line, and which each output a Y/C separated video signal; a control unit 170, which inputs the first to fourth connection signals T1 to T12 generated from the composite video input jacks 53, 55, 57 and 59, the Y/C separated video input jacks 52, 54, 56 and 58, the composite video output jacks 61 and 63, and the Y/C separated video output jacks 60 and 62, and which generates first switching control signals S1, S2 and S3, and second switching control signal S6; a first multiplexer 110, which selects one of the composite video input jacks 53, 55, 57 and 59; a second multiplexer 120, which selects one of the luminance signal input terminals of the Y/C separated video input jacks 52, 54, 56, and 58; a third multiplexer 130, which selects one of the chrominance signal input terminals of the Y/C separated video input jacks 52, 54, 56, and 58; a luminance/chrominance signal separating unit 150, which inputs the composite video signal selected by the first multiplexer 110 and separates that inputted signal into a luminance signal Y and a chrominance signal C; an on-screen path control unit 140, which selects one of either the composite video signal selected by the first multiplexer 110, or the luminance signal separated by the luminance/chrominance signal separating unit 150, or the luminance signal of the Y/C separated video signal selected by the second multiplexer 120 in response to first switching control signals S1 to S3, mixes the selected signal with an on-screen signal, and outputs the mixed signal to the composite video output jack 61 or to the luminance signal output terminal of the Y/C separated video output jack 60; and a chrominance signal path control unit 160, which selects either the chrominance signal separated by the luminance/chrominance signal separating unit 150 or the chrominance signal of the Y/C separated video signal selected by the third multiplexer 130, and which outputs the selected signal to the chrominance signal output terminal of the Y/C separated video output jack 60.

Output jacks 62 and 63 for supplying video signal to a VCR are further included. The composite video signal is connected to the output jack 63 through a VCR output terminal included in the first multiplexer 110. Moreover, the luminance signal and the chrominance signal of the Y/C separated video signal are connected to the Y/C separated output jack 62 through VCR output terminals provided at the second and third multiplexer 120 and 130. The chrominance signal which is connected to the Y/C separated output jack 62, is selected by a switching unit 190 which selects either the chrominance signal separated by the luminance/chrominance signal separating unit 150 or the chrominance signal of the Y/C separated video signal selected by the third multiplexer 130. The luminance signal which is connected to the Y/C separated output jack 62, is selected by a switching unit 180 which selects either the luminance signal separated by the luminance/chrominance signal separating unit 150 or the luminance signal of the Y/C separated video signal selected by the second multiplexer 120.

The on-screen path control unit 140 includes: a first switch unit 142, which selects either the composite video signal selected by the first multiplexer 110 in response to the first switching control signals S1 to S3 or the luminance signal separated by the luminance/chrominance signal separating unit 150; a second switch unit 144, which selects either the output of the first switch unit 142 or the luminance signal of the Y/C separated video signal selected by the second multiplexer 120; an on-screen signal generating unit 146, which receives the output of the second switch unit 144 and superposes the on-screen signal on it; and a third switch unit 148, which outputs the output signal of the on-screen signal generating unit 146 to the composite video output jack 61 or to the luminance signal output terminal of the Y/C separated video output jack 60.

The first switching control signals S1, S2 and S3 make a path so that the on-screen signal can be superposed on the composite video signal selected by the first multiplexer 110 and can be outputted, in the case that an external composite video line is connected to the composite video signal input jacks 53, 55, 57 and 59 and an external composite video line is connected to the composite video signal output jack 61. In the case that an external composite video line is connected to the composite video signal input jacks 53, 55, 57 and 59 and an external Y/C separated video line is connected to the Y/C separated video signal output jack 60, a path is formed so that the on-screen signal can be superposed on the luminance signal separated by the luminance/chrominance signal separating unit 150 from the composite video signal selected by the first multiplexer 110 and can be outputted. Moreover, in the case that an external Y/C separated video line is connected to the Y/C separated video signal input jacks 52, 54, 56 and 58, and an external Y/C separated video line is connected to the Y/C separated video signal output jack 60, a path is formed so that the on-screen signal can be superposed on the luminance signal of the Y/C separated video signal selected by the second multiplexer 120 and can be outputted.

The second switching control signal S6 makes a path so that the chrominance signal separated by the luminance/chrominance signal separating unit 150 from the composite video signal selected by the first multiplexer 110 can be outputted, in the case that an external composite video line is connected to the composite video signal input jacks 53, 55, 57 and 59, and an external Y/C separated video line is connected to the Y/C separated video signal output jack 60. Moreover, in the case that an external Y/C separated video line is connected to the Y/C separated video signal input jacks 52, 54, 56 and 58 and an external Y/C separated video line is connected to the Y/C separated video signal output jack 60, the second switching control signal S6 makes a path so that the chrominance signal of the Y/C separated video signal selected by the third multiplexer 130 can be outputted.

When recording the composite video signal as the Y/C separated video signal on a video tape, the switching unit 180 is controlled by a switching control signal S4 so that the luminance signal or the chrominance signal separated by the luminance/chrominance signal separating unit 150 can be selected and outputted to the Y/C separated output jack 62. On the other hand, when outputting the Y/C separated video signal as the Y/C separated video signal to a VCR, the switching unit 190 is controlled by a switching control signal S5 so that the luminance signal outputted from the second multiplexer or the chrominance signal outputted from the third multiplexer can be selected and outputted to the Y/C separated output jack 62. Each switching unit is switched to the terminal displayed as 'H' when the applied switching control signal is high, and is alternatively switched to the terminal displayed as 'L' when the applied signal is low.

As described above, the video line connection apparatus according to the present invention first checks the connection state of the video lines which are connected to the input/output terminal, and then adaptably connects a path for the video signal so that the path most suitable to the input/output characteristic of the checked video lines can be formed, thereby removing the user's uneasiness caused by improper connection of the lines, and offering convenience to the users.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A video line connection apparatus for adaptively connecting an external input/output line, the apparatus comprising:
    a plurality of Y/C separated video input jacks for inputting Y/C separated video signals;
    a plurality of composite video input jacks for inputting composite video signals;
    at least one Y/C separated video output jack for outputting Y/C separated video signals;
    at least one composite video output jack for outputting composite video signals;
    first selecting means for selecting one of said plurality of Y/C separated video input jacks to input a selected Y/C separated video signal;
    second selecting means for selecting one of said plurality of composite video input jacks to input a selected composite video signal;
    third selecting means for selecting either the selected Y/C separated video signal or the selected composite video signal; and
    a control unit, connected to said Y/C separated video input jacks and to said composite video input jacks and to said third selecting means, to automatically control the formation of a path for either the selected Y/C separated video signal or the selected composite video signal from either said Y/C separated video input jacks or said composite video input jacks to either said Y/C separated video output jack or said composite video output jack, so that a video signal inputted as a Y/C separated video signal is outputted as a Y/C separated video signal and so that a video signal inputted as a composite video signal is outputted as a composite video signal.

2. A video line connection apparatus for adaptively connecting an external input/output line, the apparatus comprising:
    a plurality of composite video input jacks, which each generate a first connection signal in response to their connection to an external composite video line, and which each input a composite video signal;
    a plurality of Y/C separated video input jacks, which each generate a second connection signal in response to their connection to an external Y/C separated video line, and which each input a Y/C separated video signal;
    at least one composite video output jack, which generates a third connection signal in response to the connection of an external composite video line, and which outputs the composite video signal;
    at least one Y/C separated video output jack, which generates a fourth connection signal in response to the connection of an external Y/C separated video line, and which outputs the Y/C separated video signal;
    control means, which inputs first to fourth connection signals generated by said composite video input jacks, said Y/C separated video input jacks, said composite video output jack and said Y/C separated video output jack, and which generates a first and a second switching control signals.
    a first multiplexer which selects one of said composite video input jacks;
    a second multiplexer which selects a singular luminance signal input terminal of said Y/C separated video input jacks;
    a third multiplexer which selects a singular chrominance signal input terminal of said Y/C separated video input jacks;
    luminance/chrominance signal separating means, which inputs the composite video signal selected by said first multiplexer and separates that composite video signal into a luminance signal and a chrominance signal;
    on-screen path control means, which selects one of either the composite video signal selected by said first multiplexer, or the luminance signal separated by said luminance/chrominance signal separating means, or the luminance signal of the Y/C separated video signal selected by said second multiplexer in response to the first switching control signal, mixes the selected signal with an on-screen signal, and outputs the mixed signal to said composite video output jack or to a luminance signal output terminal of said Y/C separated video output jack; and
    chrominance signal path control means, which selects either the chrominance signal separated by said luminance/chrominance signal separating means or the chrominance signal of the Y/C separated video signal selected by said third multiplexer in response to the second switching control signal, and which outputs the selected signal to a chrominance signal output terminal of said Y/C separated video output jack.

3. The apparatus of claim 2, wherein said on-screen path control means comprises:
    first switch means, which selects either the composite video signal selected by said first multiplexer in response to said first switching control signals or the luminance signal separated by said luminance/chrominance signal separating means;
    second switch means, which selects either the output of said first switch means or the luminance signal of the Y/C separated video signal selected by said second multiplexer;
    on-screen signal generating means, which receives the output of said second switch means and superposes the on-screen signal on it; and
    third switch means, which outputs the output signal of said on-screen signal generating means to said composite video output jack or to the luminance signal output terminal of said Y/C separated video output jack.

4. The apparatus of claim 2, wherein said first switching control signals form:
- a path so that the on-screen signal can be superposed on the composite video signal selected by said first multiplexer and can be outputted, in the case that an external composite video line is connected to said composite video signal input jacks and an external composite video line is connected to said composite video signal output jack;
- a path so that the on-screen signal can be superposed on the luminance signal separated by said luminance/chrominance signal separating means from the composite video signal selected by said first multiplexer and can be outputted, in the case that an external composite video line is connected to said composite video signal input jacks and an external Y/C separated video line is connected to said Y/C separated video signal output jack; and
- a path so that the on-screen signal can be superposed on the luminance signal of the Y/C separated video signal selected by said second multiplexer and can be outputted, in the case that an external Y/C separated video line is connected to said Y/C separated video signal input jacks and an external Y/C separated video line is connected to said Y/C separated video signal output jack.

5. The apparatus of claim 2, wherein said second switching control signal forms:
- a path so that the chrominance signal separated by said luminance/chrominance signal separating means from the composite video signal selected by said first multiplexer can be outputted, in the case that an external composite video line is connected to said composite video signal input jacks and an external Y/C separated video line is connected to said Y/C separated video signal output jack; and
- a path so that the chrominance signal of the Y/C separated video signal selected by said third multiplexer can be outputted, in the case that an external Y/C separated video line is connected to said Y/C separated video signal input jacks and an external Y/C separated video line is connected to said Y/C separated video signal output jack.

* * * * *